(12) United States Patent
Robertson

(10) Patent No.: US 7,584,110 B2
(45) Date of Patent: Sep. 1, 2009

(54) SYSTEM AND METHOD FOR BOOKING OF HOTEL ACCOMMODATIONS FOR TRAVELERS

(75) Inventor: David Robertson, Dubai (AE)

(73) Assignee: Emirates, Dubai (AE)

( * ) Notice: Subject to any disclaimer, the term of this patent is extended or adjusted under 35 U.S.C. 154(b) by 737 days.

(21) Appl. No.: 11/229,557

(22) Filed: Sep. 20, 2005

(65) Prior Publication Data

US 2007/0067193 A1 Mar. 22, 2007

(51) Int. Cl.
*G06Q 10/00* (2006.01)
(52) U.S. Cl. .............................. 705/5; 705/1; 235/375
(58) Field of Classification Search .................... 705/5, 705/1, 37; 235/375; 707/3
See application file for complete search history.

(56) References Cited

U.S. PATENT DOCUMENTS

| | | | |
|---|---|---|---|
| 6,477,503 B1* | 11/2002 | Mankes | 705/5 |
| 6,993,503 B1* | 1/2006 | Heissenbuttel et al. | 705/37 |
| 7,069,228 B1* | 6/2006 | Rose et al. | 705/5 |
| 7,212,978 B2 | 5/2007 | Kowal et al. | |
| 7,328,166 B1* | 2/2008 | Geoghegan et al. | 705/5 |
| 2003/0004760 A1* | 1/2003 | Schiff et al. | 705/5 |
| 2003/0028452 A1* | 2/2003 | Whitney, III | 705/28 |
| 2004/0128173 A1* | 7/2004 | Salonen | 705/5 |
| 2005/0004818 A1* | 1/2005 | Liman | 705/5 |
| 2005/0256749 A1* | 11/2005 | Crockett et al. | 705/5 |
| 2005/0288974 A1* | 12/2005 | Baranowski et al. | 705/6 |
| 2006/0190307 A1* | 8/2006 | Maxwell | 705/5 |
| 2006/0271514 A1* | 11/2006 | Chang et al. | 707/3 |
| 2007/0271123 A1* | 11/2007 | Miyashita | 705/5 |
| 2008/0010105 A1* | 1/2008 | Rose et al. | 705/5 |
| 2008/0142581 A1* | 6/2008 | Roebke et al. | 235/375 |

OTHER PUBLICATIONS

David Booth, "Web Services Description Language Version 2.0 Part 0: Primer", W3C; Dec. 21, 2004. pp. 5-7.*
"Galileo Launches Global Web Services Platform" May 15, 2003. pp. 1-4.*
David Orchard, "Web Service Pitfalls" xml.com Feb. 13, 2002. pp. 1-3.*

* cited by examiner

*Primary Examiner*—John W Hayes
*Assistant Examiner*—Brian Epstein
(74) *Attorney, Agent, or Firm*—Bardmesser Law Group

(57) ABSTRACT

A method of making a hotel reservation includes receiving a reservation request from a booking source, wherein the reservation request is based on an allocation to the booking source from a hotel and wherein the reservation request is price-blind; transmitting the reservation request to the hotel; receiving a confirmation from the hotel; and transmitting the confirmation to the booking source. The booking source can be a consolidator, a travel agent, a tour operator, a Global Distribution System or a wholesaler. The method also includes connecting to the hotel using a web service to transmit the reservation to the hotel. If the reservation request exceeds the allocation, the hotel has an option of accepting the reservation request or declining the reservation request. The method also includes receiving polling inquiries from the booking source prior to transmitting the hotel's confirmation to the booking source. The confirmation from the hotel can be received using a web service. The confirmation can be transmitted to the booking source using a web service. The reservation request can include a "special request." The method can also include translating parameters of the reservation request from a format of the booking source to a format of the hotel.

13 Claims, 7 Drawing Sheets

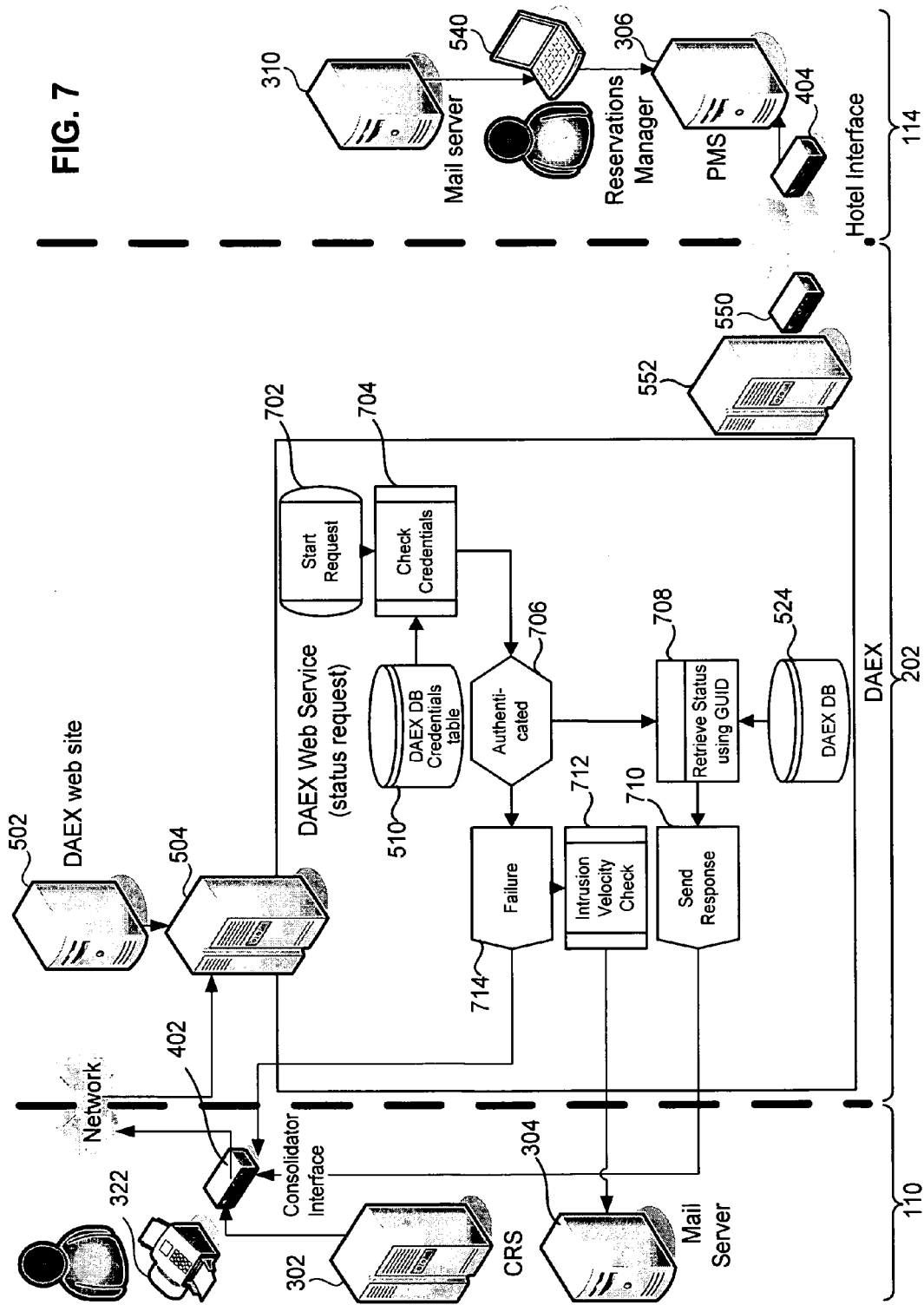

SYSTEM AND METHOD FOR BOOKING OF HOTEL ACCOMMODATIONS FOR TRAVELERS

BACKGROUND OF THE INVENTION

1. Field of the Invention

The present invention is related to booking of hotel accommodations for travelers, and more particularly, to automating the process of exchanging information regarding hotel bookings.

2. Background Art

At the present time, the process of booking hotel accommodations lags far behind in automation compared to its close relative, the process of booking airline tickets. In the airline industry, Global Distribution Systems (GDSs) exist to consolidate the information regarding flights, seats, times of departure and arrival, prices, etc. Virtually all the world's airlines, and, for all practical purposes, all the travel agents, are connected to one or more GDSs. This permits a relatively painless process of booking a flight (either by the travel agent, or by the consumer directly through the Internet), confirming the purchase, collecting the money from the passenger, etc.

In the hotel industry, this is far from being the case. Unlike airline seats (which come essentially in only three "varieties"—economy class, business class, and first class, with possibly some minor variations, such as "premium economy" on some airlines), there is a lack of standardization in the hotel industry of the terms used to describe a particular room, and a vastly greater variety of products offered to the consumer. For example, one hotel could refer to its room with a queen-size bed, roughly 40 square meters in area, and having an ocean view, as "DBL-DLX-Ocean-VW." Another hotel could refer to the same exact type of room as "Double Queen—Deluxe View." This presents a problem in automating the reservation process.

Because the GDSs, the travel agents, consolidators and the hotels all frequently use their own codes to describe the same products (for example, the same double room with a sea view can also be called DBLVIEW, DBSVW, etc., by other hotels), there is no consistency in the information exchange between the various "actors," in the reservation process.

Although many hotels also subscribe to the GDSs, and therefore some hotel information is available through the GDSs, this information is incomplete. In essence, the process of booking a hotel room through a travel agent has changed little in the last 15-20 years, when fax machines became widely available. The travel agent sends a fax to the hotel, requesting to book a room. That fax is received, printed out, and is then manually entered into the hotel's reservation system. A confirmation is then sent back to the travel agent, by fax, email or through some other mechanism.

It should be remembered that frequently, a confirmation received during an online booking process, through many travel websites, does not, in fact, "confirm" that the room will be available to the customer. The confirmation that many travel websites provide to the consumer is not a confirmation from the hotel, but only a confirmation from the travel website. It is entirely possible for the consumer to show up at the hotel, only to discover that there is, in fact, no room waiting for him at the price agreed to earlier.

A "consolidator" is essentially another term for a very large travel agency or a tour operator. A consolidator often has smaller travel agents as its customers. The travel agent in turn has consumers, or hotel guests, as its customers. Consolidators, being larger business entities, frequently have their own computer systems that keep track of sales, allocations, places, etc. The information in the consolidator's own database is normally sufficient to actually sell the room—in other words, the consolidator knows the price, the customer's name, the hotel, and, given the allocation, that the room will actually be available. Note, however, that a confirmation from the consolidator is still not necessarily a confirmation that the room has actually been reserved by that guest for that hotel. It is only a confirmation from the consolidator's computer system. Note also that frequently, the travel agent (with whom the customer deals with directly) calls not the hotel, but the consolidator, and passes the consolidator's confirmation (not the hotel's confirmation) on to the customer. The consolidator, at this point, still needs to fax to the hotel the reservation, and receive the hotel's confirmation.

An "allocation," or "allotment," in the travel industry, refers to an agreement between a particular hotel (or hotel chain) and a travel agent, (or a consolidator, or tour operator, etc.) Essentially, the consolidator promises the hotel that he will sell X number of rooms, and the hotel gives the travel agent a certain price (which, given the volume sale, is usually at a discount from its "standard" rates). However, since the hotel does not want the inventory to simply "sit there," usually there is a time limit on the allocation, for example, 30 days, 60 days, 90 days, etc. In other words, the travel agent can only book the room at most X days in advance.

Many travel agencies, particularly large ones, have their own separate allocations with many hotels. Other travel agents do not have separate agreements, but instead rely on published hotel room prices. Typically, each hotel that has such allocation agreements with a consolidator, assigns a code to each such consolidator. Frequently, the particular allocation agreement (or discount) that the hotel gives to the consolidator is also assigned its own special code by the hotel. This code (rate code) needs to be communicated to the hotel by the consolidator when booking the room for the customer.

FIG. 1 illustrates a conventional "disconnected" environment used to make hotel reservations. As shown in FIG. 1, customers 102 can interface to a central reservations office (CRO) 104, to a hotel web site 106, to an alternate distribution system (ADS) 108, or to travel agents and wholesalers (consolidators) 110 (or to their websites 111). The alternate distribution systems 108 and the travel agents 110 can interface to the Global Distribution Systems 112. The central reservations office 104, the hotel web site 106, and Global Distribution Systems 112 then, in turn, interface to a property group 114 (in other words, a hotel chain consisting of, e.g., A, B, C, D, or, in some instances, a single hotel-in this example, only hotels A and B have a central reservations office). As noted by the dotted and dashed lines in the FIG. 1, most of the interfaces to the property group (hotel) 114 are manual, requiring faxing of the reservation information and then manual entry into the hotel's computer system. (in this example, the only truly automated path is between 106, 104 and hotels A and B)

All bookings require a confirmation from the hotel 114, otherwise, they are not treated as "confirmed" bookings. Frequently a 48-hour turn around time is required for bookings to be confirmed. This restricts publishing of last minute availability of hotel rooms, since most hotels do not operate a 24-hour reservation center. Although the numbers are generally geographic and hotel-specific, the problem is a common one in the travel industry.

One way to send reservation requests to a hotel, as shown in FIG. 1, is from a hotel (or chain) website 106. The website 106 can be linked via a middleware application or service to the hotel central reservation office (CRO) 104, which in turn connects to the Property Management System (PMS) at the hotel being booked.

However, the link between CRO 104 and PMS may only be one-way, i.e., the CRO and web site only have a limited view of the availability at the hotel 114. The hotel's PMS is the only true view of a hotel's room inventory in real-time. Also, there are costs associated with licensing and supporting the middleware tier used to make the booking; there may be additional costs per transaction Another way is using middleware (i.e., a third party application that can talk to the PMS). The website 106 links to the hotel PMS using the middleware or the website 106 can simply send an email request to the reservations department from the web user/customer. If there is a direct connection to the PMS, then this is the best option available, but it will have transaction costs or support and maintenance cost associated with it. If the website1O6 is not connected to the PMS, then there is a problem with managing the allocation and rates shown on the website, in addition to the process required in making and confirming the booking at the hotel level.

Another way is for the hotel 114 to use a market representation company 116 to process all bookings. This usually involves having the booking section of the hotel website 106 provided by a third party and residing in an HTML frame on another server. This option usually has a sales cost associated with it, and does not help the hotel 114 reduce costs by dealing directly with guest. The market representation company 116 is essentially acting as a travel agent and making the sale on behalf of the hotel 114. The hotel 114 has limited control over the "look and feel" of the booking element of the website 106.

Also, the market representation company 116 does not have a direct link into the hotel PMS, so each reservation received via the web site 106 will need to be manually entered into the PMS, possibly introducing error and delay.

Consolidators 110 can send faxes or emails to the hotel CRO 104, which are processed manually in a Central Reservation System (CRS) (not shown in FIG. 1, but usually located in the CRO 104) by a reservation agent, and a CRS confirmation is sent back manually to the consolidator via fax or email. This method relies on reservation agents receiving communication that is then printed out and re-keyed (or cut and pasted) into a CRS. A CRS confirmation (not a confirmation from the PMS/hotel) is then sent back to the consolidator 110. Similar issues exist when using travel agent or consolidator websites 111 to make the booking.

Market representation companies 116 do not have direct links to the hotel PMS, so each reservation has to be sent to the hotel 114 and then printed out and re-keyed (or cut and pasted) into the PMS. The consolidator 110 is provided with a confirmation by the market representation company 116, but this is no guarantee that the hotel 114 has even received the booking.

Yet another way is for the consolidator 110 to use a GDS 112 to make the booking. However, the GDS 112 is the most disconnected channel to the hotel 114.

The hotel 114 only provides a limited view of availability to the GDS 112 and incurs an additional charge higher than that of a market representation company 116 fee for every booking process at the GDS 112 level. Today it is very rare to find a GDS 112 that has a direct connection to a hotel at the PMS level required to process bookings in near real-time Another way to reserve a room is through Alternative Distribution Systems (ADSs) 108. This is essentially the same scenario as using travel agents or consolidators 110, discussed above. ADSs 108 tend to be large online travel portals that are treated by hotels 114 as consolidators or wholesalers of rooms. Their focus tends to be based on price and convenience to their customers. Many hotels provide ADSs 108 with last minute (volatile) inventory at much reduced rates, and therefore have to put considerable effort into managing this sales channel, as far as what the hotel 114 can sell, and at what rate. This is usually done through a form of extranet, requiring the reservations staff to log into the system to upload inventory and rates on a daily or even hourly basis.

However, ADSs 108 sell online and provide customers with their own confirmation codes, without being able to guarantee that the hotel has received the reservation. In many instances, hotels 114 have to connect to the ADS 108 extranet to retrieve any booking for their property—in other cases an email (or fax) is sent to the hotel 114 containing the reservation request. Therefore, each reservation has to be printed out and re-keyed (or cut and pasted) into the PMS before a valid hotel 114 confirmation can be sent back by email or after connecting to the ADS 108 extranet.

Accordingly, there is a need in the industry for an automated "exchange" that permits booking of hotel rooms and exchange of actual confirmation information, while maintaining confidentiality of hotel-travel agent commercial information.

SUMMARY OF THE INVENTION

The present invention relates to a system and method for booking of hotel accommodations for travelers that substantially obviate one or more of the disadvantages of the related art.

More particularly, in an exemplary embodiment of the present invention, a method of making a hotel reservation includes receiving a reservation request from a booking source, wherein the reservation request is based on an allocation to the booking source from a hotel and wherein the reservation request is price-blind; transmitting the reservation request to the hotel; receiving a confirmation from the hotel; and transmitting the confirmation to the booking source. The booking source can be a consolidator, a travel agent, a tour operator, a Global Distribution System or a wholesaler.

The method can also include connecting to the hotel using a web service to transmit the reservation to the hotel. If the reservation request exceeds the allocation, the hotel has an option of accepting the reservation request or declining the reservation request. The method also includes receiving polling inquiries from the booking source prior to transmitting the hotel's confirmation to the booking source. The confirmation from the hotel can be -received using a web service. The confirmation can be transmitted to the booking source using a web service. The reservation request can include a "special request." The method can also include translating parameters of the reservation request from a format of the booking source to a format of the hotel.

In another aspect, a system for processing hotel reservations includes a first web service for receiving a reservation request from a booking source; a second web service for interfacing to a hotel and receiving an online confirmation of the reservation request from the hotel; a database for storing the reservation request if the hotel is offline; and a third web service for communicating the confirmation to the booking source. A translation table can be used for converting reservation request formats between the booking source and the hotel. In an alternative embodiment, a single webservice can support multiple transaction types, calls and commands.

In another aspect, a method of making a hotel reservation includes receiving a reservation request from a booking source in a format of a booking source; translating the reservation request to a standardized format; transmitting the reservation request to the hotel in the standardized format;

receiving a confirmation from the hotel; and transmitting the confirmation to the booking source in the format of the booking source.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE FIGURES

The accompanying drawings, which are included to provide a further understanding of the invention and are incorporated in and constitute a part of this specification, illustrate embodiments of the invention and together with the description serve to explain the principles of the invention. In the drawings:

FIG. 7 illustrates the handling of status request by the DAEX web service.

DETAILED DESCRIPTION OF THE INVENTION

Reference will now be made in detail to embodiments of the present invention, examples of which are illustrated in the accompanying drawings.

In the context of the present discussion, "web services" should be distinguished from "web servers." Web servers are constructs that are most familiar to people who use the Internet. A web server generates a web page that is viewed by a user in a browser after clicking on a link or typing a URL (universal resource locator). A web service, on the other hand, does not generate web pages, but delivers information over the Internet. For example, when a consumer buys a book at an online bookstore, that book may be shipped via Federal Express. When the next day the consumer goes on the online bookstore's website, and checks on the status of the order, the online bookstore's server sends a request to a web service maintained by Federal Express. That web service, which is implemented using some type of a computer, queries its own database for the status of that order and sends the information back to the online bookstore's web server, which in turn displays it on a web page to the customer. In other words, a web service does not maintain web pages, although the information from the web service may be used in the creation of web pages. Essentially, "web services" refers to computers "talking" to each other and consuming each others' functionality over the Internet, rather than users directly communicating with a web server using a browser.

In the discussion below, a consolidator 110 is used as an example of a booking source who talks to a DAEX web service, discussed below, although it will be appreciated that anyone who acts as a travel agent (large or small) can play the role of a consolidator.

Figure 1:
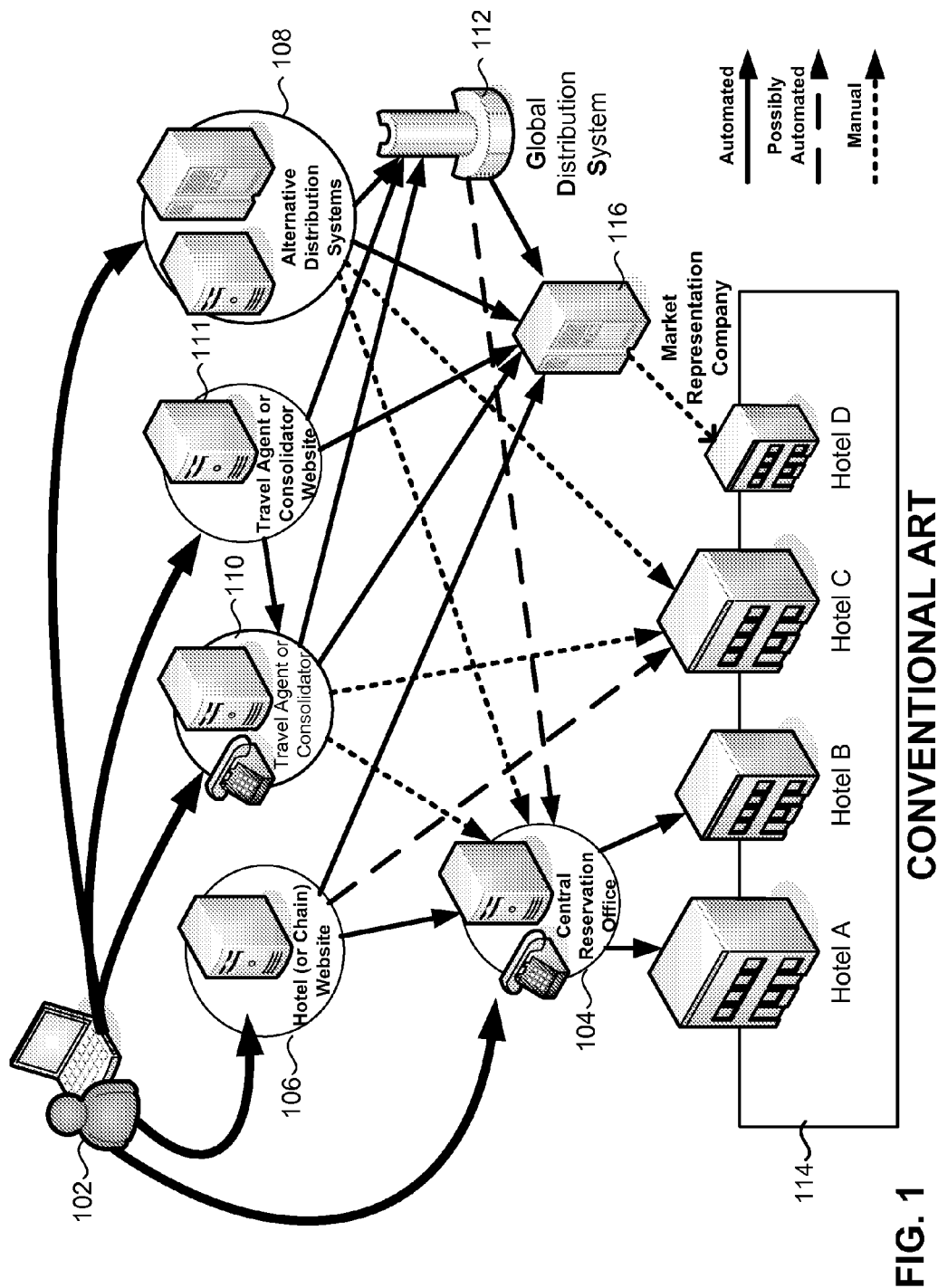
FIG. 1 illustrates a conventional "disconnected" environment used to make hotel reservations.
Figure 2:
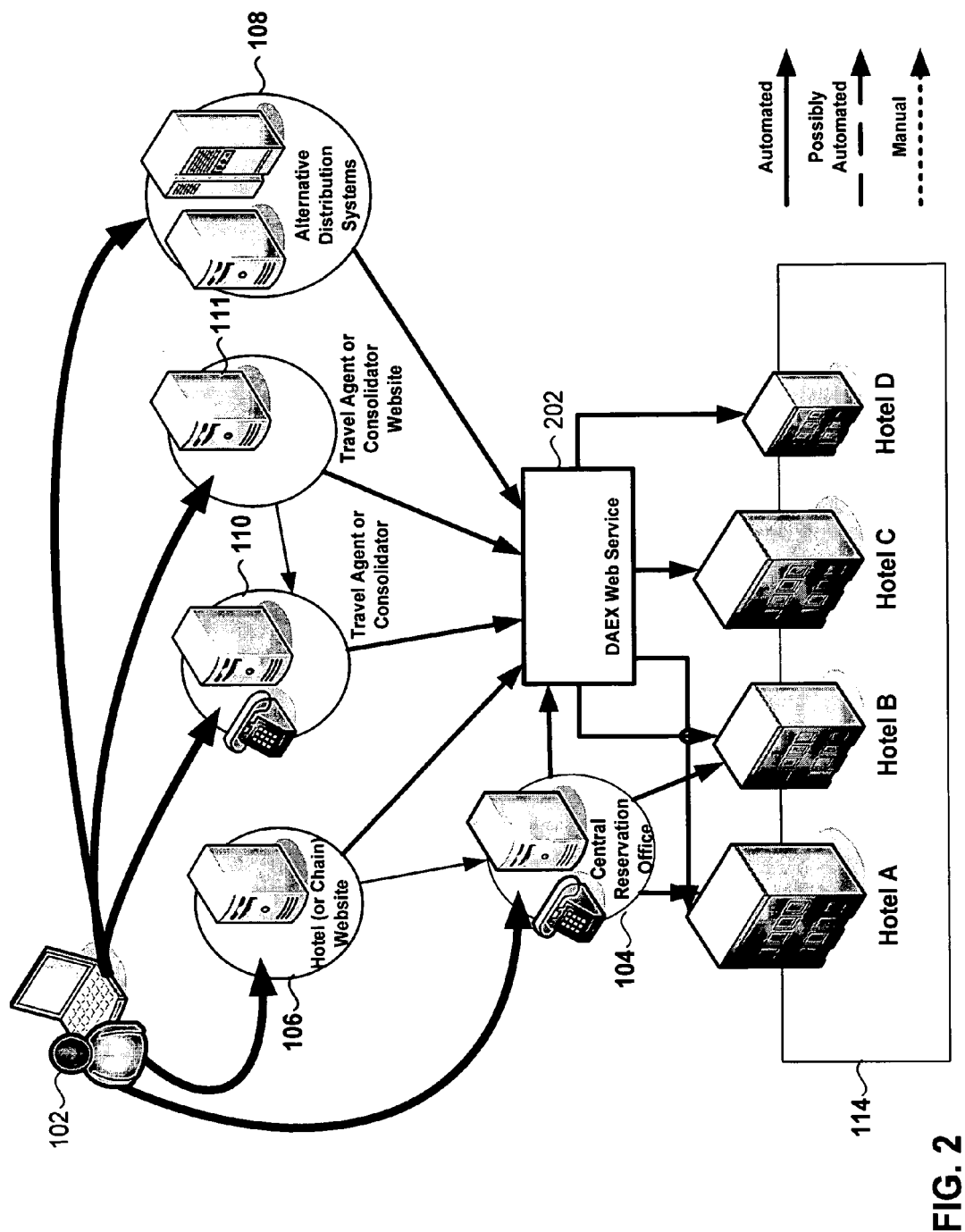
FIG. 2 shows how Destination Accommodation Exchange (DAEX) web service can address the needs of hotels and their customers.

FIG. 2 shows how a Destination Accommodation Exchange (DAEX) web service 202 can address the needs of hotel websites 106, travel agents and consolidators 110, consolidator websites 111 and alternative distribution systems 108 that have agreements in place with hotels 114. With reference to FIG. 2, DAEX web service 202 is designed to assist hotels 114 and their trading partners in processing reservations online and in near real-time.

DAEX web service 202 retrieves availability and rates (and/or rate codes) from hotels 114 and passes booking information to the hotels 114. DAEX web service 202 interfaces to travels agents and travel websites, for example, myTravelChannel (see www.mytravelchannel.com), to Wizcom and to Open Destination, which are sales channels for the various GDSs 112.

Hotel inventory and rates are exchanged between DAEX web service 202 and the hotels 114. Booking information flows to the hotels 114. DAEX web service 202 can also interface to airlines, call centers, travel websites 111, consolidators 110, user applications, and MICE ("Meetings, Incentives, Conferences and Events," a type of travel business), receiving booking requests, and returning booking confirmation.

Figure 3:
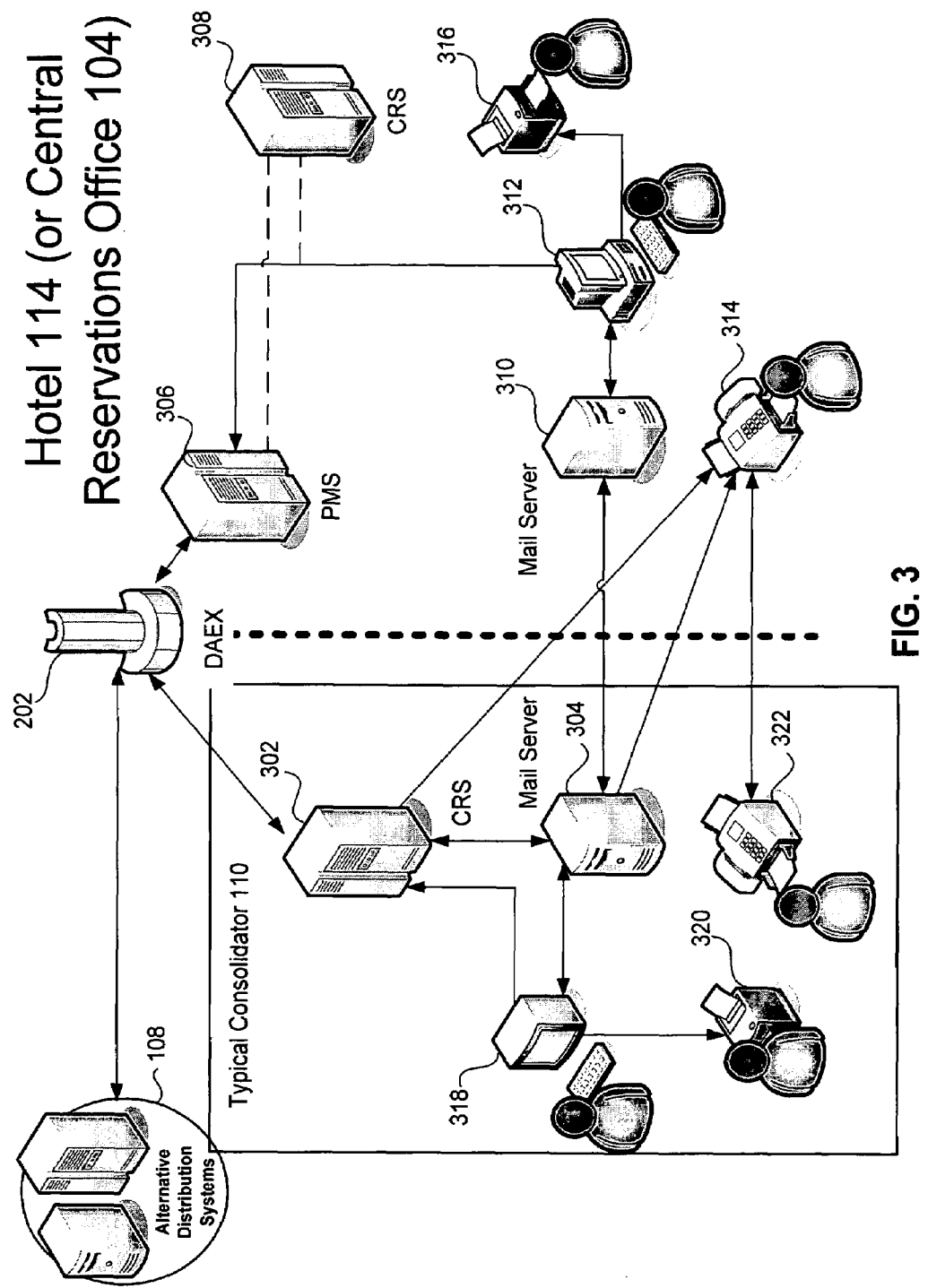
FIG. 3 shows details of a system required by consolidators to make a booking with hotels.

DAEX web service 202 provides a web service-based reservation API (Application Programming Interface) to allow DAEX web service 202 to deliver the reservations from an allocation in an on-line mode to a Property Management Systems (PMS) 306 of a hotel 114 (see FIG. 3).

DAEX web service 202 automates the manual reservation delivery process and allows hotels 114 to migrate other sources of reservations (e.g., tour operators) online, once they are connected to DAEX web service 202.

Hotel (or chain) websites 106 can be provided with an allocation at the PMS 306 level (which is usually in place already) and then, when a booking is requested, the website 106 simply calls the DAEX web service 202 with the allocation code, and a confirmation code is returned from the PMS 306 to the customer.

The consolidators' CRS 302 can send a booking request containing the allocation code and hotel identifier to the DAEX web service 202, which in turn sends the booking to the hotel PMS 306, and returns a confirmation code from the hotel 114 to the consolidator's CRS 302.

Alternative Distribution Systems 108 can access the PMS inventory through DAEX web service 202 in real-time, allowing the hotel 114 to increase or decrease rates and allocation available to the ADS 108 through the PMS 306. This is already done in the PMS today, but then the hotel has to copy that same information into the ADS 108 extranet. DAEX web service 202 removes the need to re-enter this data and also provides the confirmation required to give peace-of-mind that the reservation has been delivered to the hotel 114.

FIG. 3 shows details of a system required by consolidators 110 to make a booking with hotels 114. A consolidator 110 usually has a Central Reservation System (CRS) 302 that consists of an application to manage the booking of hotels, flights and cars. This is usually hosted on a server and accessed by sales agents (and possibly interfaced to by the consolidators' website 111—not shown in FIG. 3).

A consolidator 110 also has an email server 304, either locally hosted on managed by their Internet Service Provider. It is common for CRS 302 to connect to either the consolidator's email server 304, which in turn use the Internet to connect to the hotel's email server 310 for the purpose of sending reservation requests. It is also not uncommon for a consolidator 110 to use a printer 320 and fax machine 322 (or a fax gateway connected to the CRS 302) to send reservation requests to the hotel's fax machine 314—in many instances a large consolidator 110 is provided with a dedicated fax machine at the hotel 114 purely for the purpose of prioritizing their booking requests (rather than have them sitting in a generic fax in-tray).

In some instances the booking is not sent directly to the hotel, but to a Central Reservation Office (CRO) 104. Some hotel chains have regional CROs, others may have a global CRO. Where a CRO 104 is managing booking for each of the hotel properties, they usually also have a hotel CRS 308 in place that sends reservations received at the CRO 104 down to the PMS at the hotel being requested.

A booking request can enter the hotel 114 or CRO 104 through either email or fax. In each instance a reservation agent is required to take the booking request and retype (or cut and paste) the request into either the hotel CRS 308 or PMS 306. A reservation agent will then either fax or email a confirmation back to the requester (consolidator 110, travel agent, etc.)

Figure 4:
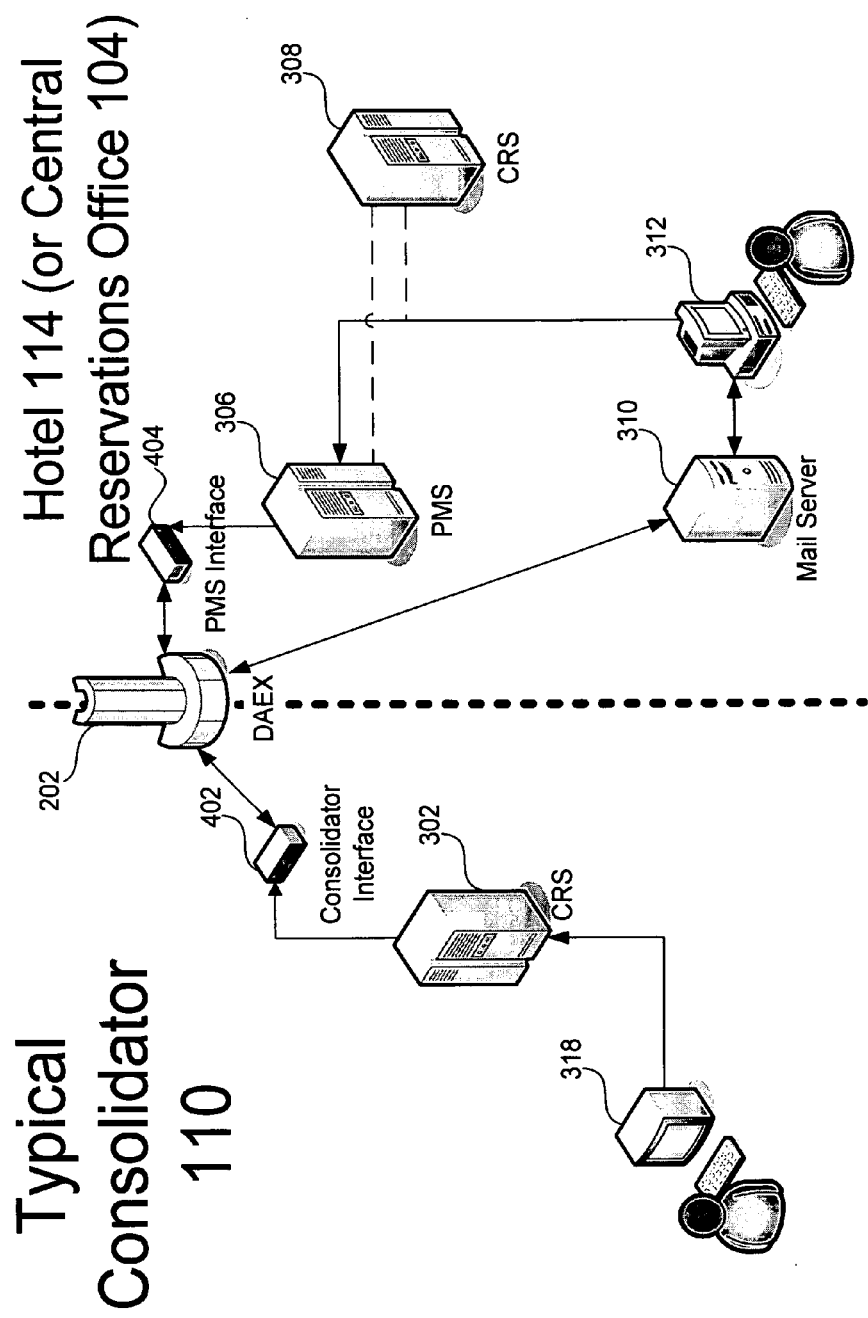
FIG. 4 illustrates how DAEX web service removes the need for any manual intervention to process a reservation request for a consolidator that has an allocation with a hotel.

FIG. 4 illustrates how DAEX web service 202 removes the need for any manual intervention to process a reservation request for a consolidator 110 that has an allocation within a hotel 114. The consolidator's CRS 302 sends the booking request to the DAEX web service 202, which in turn sends the reservation directly to a PMS interface 404 (see also FIG. 5) connected to the hotel PMS 306.

Figure 5:
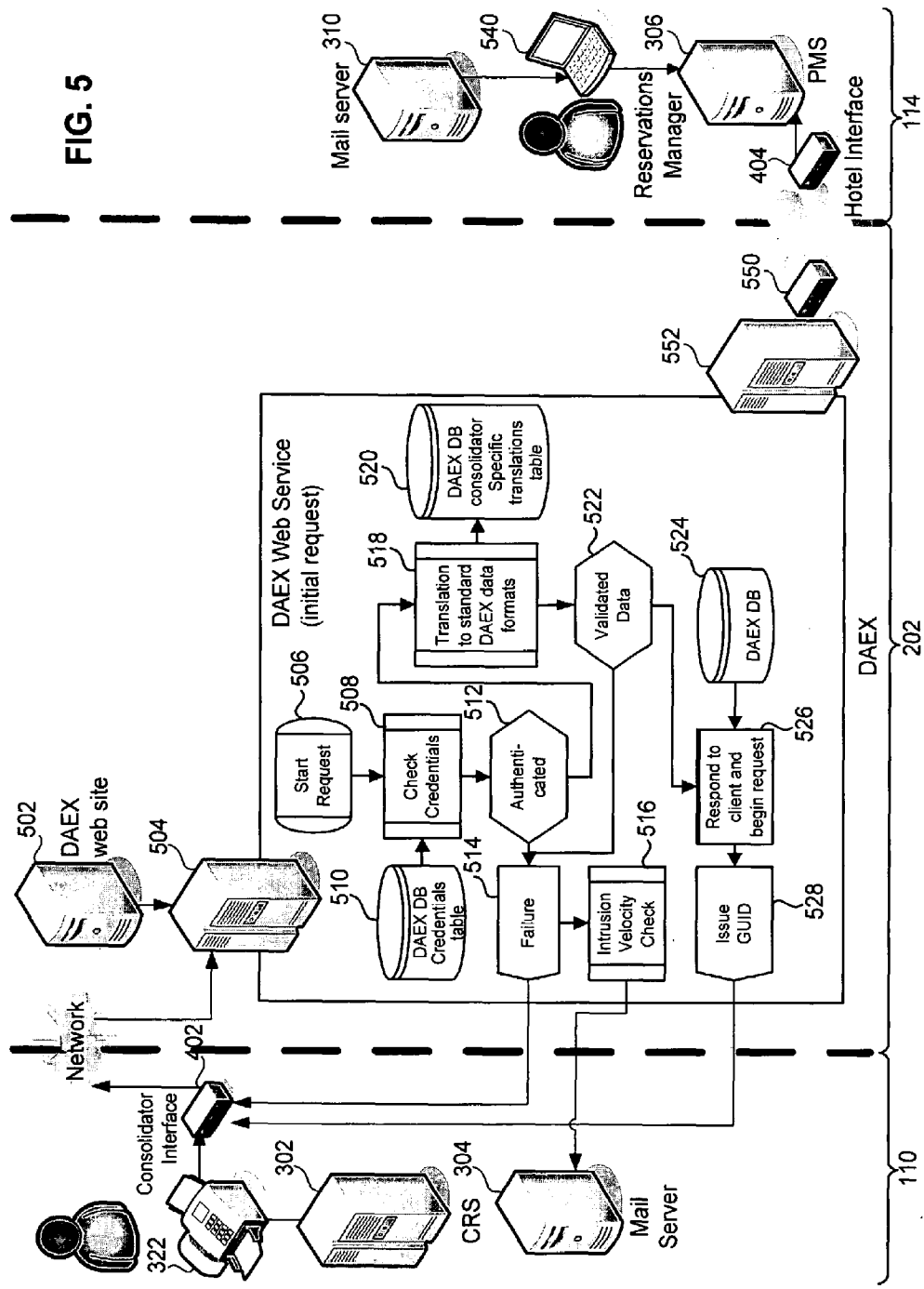
FIG. 5 illustrates the process of how DAEX web service processes the initial request for a booking.

As shown in FIG. 5, one exemplary arrangement of a consolidator 110 includes a consolidator mail server 304, central reservation system 302 (or application to manage sales and/or allocations for a consolidator) and a consolidator interface 402 (these may be combined into one physical device), which is connected to the DAEX web service 202 via a network, such as the Internet.

The DAEX web service 202 interfaces to a consolidator 110 on one side, and to the hotel 114 on the other side. Optionally, a DAEX website 502 may be used, for example, by small travel agencies that can use their web browsers to interface to DAEX web service 202. In the event that a consolidator 110 or travel agent does not have a central reservation system of their own, then the DAEX website 502 provides a simple web interface that can be accessed using a web browser and internet connection. The DAEX website 502 provides this functionality through web pages that use the DAEX web service 202 functionality described herein.

The DAEX web service 202 is connected through a network to a consolidator interface 402. The consolidator interface 402 in turn connects to the consolidators' reservation system 302, to a fax or telephone machine 322, and other hardware available on the consolidator 110 side. On the hotel 114 side, the DAEX web service 202 interfaces to the hotel PMS 306 through the PMS interface 404 through an interface 550. On the hotel 114 side, there is typically a mail server 310, which can be connected to the reservations manager 540, who is in turn connected to the PMS 306.

FIG. 5 also illustrates the process of how DAEX web service 202 processes the initial request for a booking. The input into the DAEX web service 202 is a booking request, via a web service call and a GUID is provided for tracking of the booking request (or an error message due to invalid credentials or request data). The GUID (Globally Unique Identifier) is a unique 128-bit number whose purpose is to allow tracking of the request and eventual response from the hotel 114.

Once the request is made, the consolidator 110 will use the same GUID to check on the status of this request as described previously.

The process of making a reservation starts with the reservation request (see 506), which is received from a consumer (or another travel agent) and processed to generate a reservation request guest ID (GUID). The reservation request is passed from the CRS 302 to the DAEX web service 202.

The consolidator 110 thus tells DAEX web service 202 that it wants to reserve a room at a particular hotel, which the consolidator 110 can optionally do using its own product codes. The DAEX web service 202 will then convert that product code using the standard set of product codes derived from the Open Travel Alliance (OTA) see http://www.opentravel.org/, and will then communicate the request for a reservation to the hotel 114. In other words, a translator is used to convert the consolidator's codes to a standard format. The Open Travel Alliance provides a standard set of designations for the various hotel products, including rooms, content of rooms, down to the level of whether VCR and DVD players are available for rent and for how much, view from the room, etc.

The PMS-DAEX interface 404 is responsible for delivering reservations to the PMS 306. Reservation delivery includes all subsequent modifications and cancellations. Reservations are sent (where appropriate) with the following types of profile: Guest, Company and Travel Agent. Travel agent/consolidator profiles may be matched in the PMS 306 by using the agent's IATA (International Air Travel Association) number or any pre-agreed agency code. Guest and Company profiles are matched using a user definable profile matching system. DAEX values are converted into matching values in the PMS 306 using a set of conversion tables. Users can check the status of the interface using a monitor screen were the details of the incoming messages can be viewed and printed if required.

Reservation requests are delivered to the PMS 306 in real time using the PMS-DAEX interface 404. The PMS-DAEX interface 404 communicates with the PMS 306 in real time, ensuring quick confirmation of reservations to the consolidator 110. The consolidator 110 can also act for a third party booking system.

Once the reservation is processed, the on-line interface returns the confirmation details to the consolidator 110 via DAEX web service 202.

When a booking is made by the consolidator 110, it is entered into the consolidator's reservations system and a message containing the booking request is sent to the DAEX web service 202 via the consolidator's DAEX interface 402. As further shown in FIG. 5, once an initial booking request is received from the consolidator interface 402 (see 506 in FIG. 5), the credentials of the consolidator 110 (i.e., the sender of the initial booking request) are checked (see 508).

The credentials are attempted to be authenticated using a DAEX database, or credentials table, 510 (see 512). The DAEX web service 202 authenticates the message sent by the consolidator's DAEX interface 402 (which contains a UserID and password) against the DAEX credentials database 510 that contains the credentials for each consolidator 110. Once authenticated (and, as described later, the data contained in the message is validated), the consolidator 110 is returned a reservation request GUID. At the time of issuing the GUID, DAEX web service 202 will store the reservation request (in the DAEX database 524) and queue it for processing.

If the credentials supplied in the reservation request cannot be authenticated, failure is indicated (see 514), an appropriate failure response is sent to the consolidator interface 402, and a security log entry is made containing the credentials and information provided in the booking request.

Also, an intrusion velocity check can be performed (see 516). Subject to a failure velocity setting (that counts the number of failures in a given time period to assess if someone is trying to masquerade as the consolidator 110 and guess their password), an alert may be sent to both the operations team and the registered contact at the consolidator 110, explaining the situation.

If the authentication in step 512 is successful, the booking request is translated to standard DAEX format (see 518). A consolidator-specific database or translation table may be used (see 520).

DAEX web service 202 provides a number of conversion tables. The purpose of the conversion tables is to convert values sent by DAEX web service 202 into values recognized by the hotel 114. An example of this is rate codes. Every PMS 306 can be different, and users are free to choose how rate codes are configured. This can lead to the same rate being configured slightly differently in each hotel 114. For example, the rate code "Weekend", can be configured in the following ways: WKND, Weekend or WKEND. DAEX web service 202 uses OTA-based values (e.g., WKND) and this will not always match the configuration of the same rate in PMS 306. Conversion tables are provided so that the incoming values can be converted to the appropriate codes in the PMS 306. These conversion tables are maintained locally by each consolidator 110, and DAEX web service 202 maintains an up-to-date database of the conversion tables.

Note also that this approach can be expanded to connect to the GDSs 112 (not shown in FIG. 5) In other words, the left hand side of FIG. 5 can equally apply to the GDSs 112, which essentially play the role of a travel agent or consolidator 110 in this context. This also permits the GDS 112 to confirm the booking in real time.

The request is then validated (see 522). There is no Lingua Franca among hotels, tour operators and travelers. For example, a hotel may refer to most of its rooms as deluxe sea-facing, and some rooms maybe be super-deluxe which are both sea facing and with a balcony. A tour operator can refer to the Deluxe Sea-Facing rooms as SuperiorSV (superior sea view). A Super-Deluxe Sea-Facing with Balcony would be SuperiorSVB (superior sea view balcony). The overcome this issue, DAEX web service 202 provides a common repository of standard room names that are mapped to each room type used by the consolidators 110 and to each hotels room type as stored in the PMS 306. These room types are based on data published by a standards body, such as the Open Travel Alliance (OTA), so that they can described by a common room type and amenities/facilities, for example:

TABLE 1

Example of a standard way to store rooms and associated facilities/amenities

| Example of Room Types | Example of Room Amenities |
| --- | --- |
| Standard Double bedrooms | Sea View |
| Standard King bedrooms | Town/City View |
| Suite | Desert View |
| Apartments | Poolside |
| Queen bedrooms | Executive Floor |
| Penthouses | Premium Leisure Floor |
| Studios | First floor rooms |

TABLE 1-continued

Example of a standard way to store rooms and associated facilities/amenities

| Example of Room Types | Example of Room Amenities |
| --- | --- |
| Cottage | Bathroom with bath |
| Villa | Bathroom with bath and walk in shower |

The translation process described above can either take place at the interface level, i.e. the initial reservation request from a tour operator is normalized before being sent to the DAEX web service 202. Alternatively a lookup table in DAEX web service 202 is used to match any consolidator-specific elements/descriptions (such as room type, guest details, etc.) to DAEX standard elements.

DAEX web service verifies that the initial reservation request has standard room/amenity descriptions before sending the GUID. If the data in the initial reservation request message is invalid, then an error message is returned to the consolidator's interface 402 by the DAEX web service 202 (or to the user of the DAEX web site 502), see 514. If the booking request is validated, then a response to the client, or consolidator 110, is generated, and is entered into a DAEX database 524. A GUID is then issued (see 528), which is transmitted to the consolidator interface 402.

Figure 6:
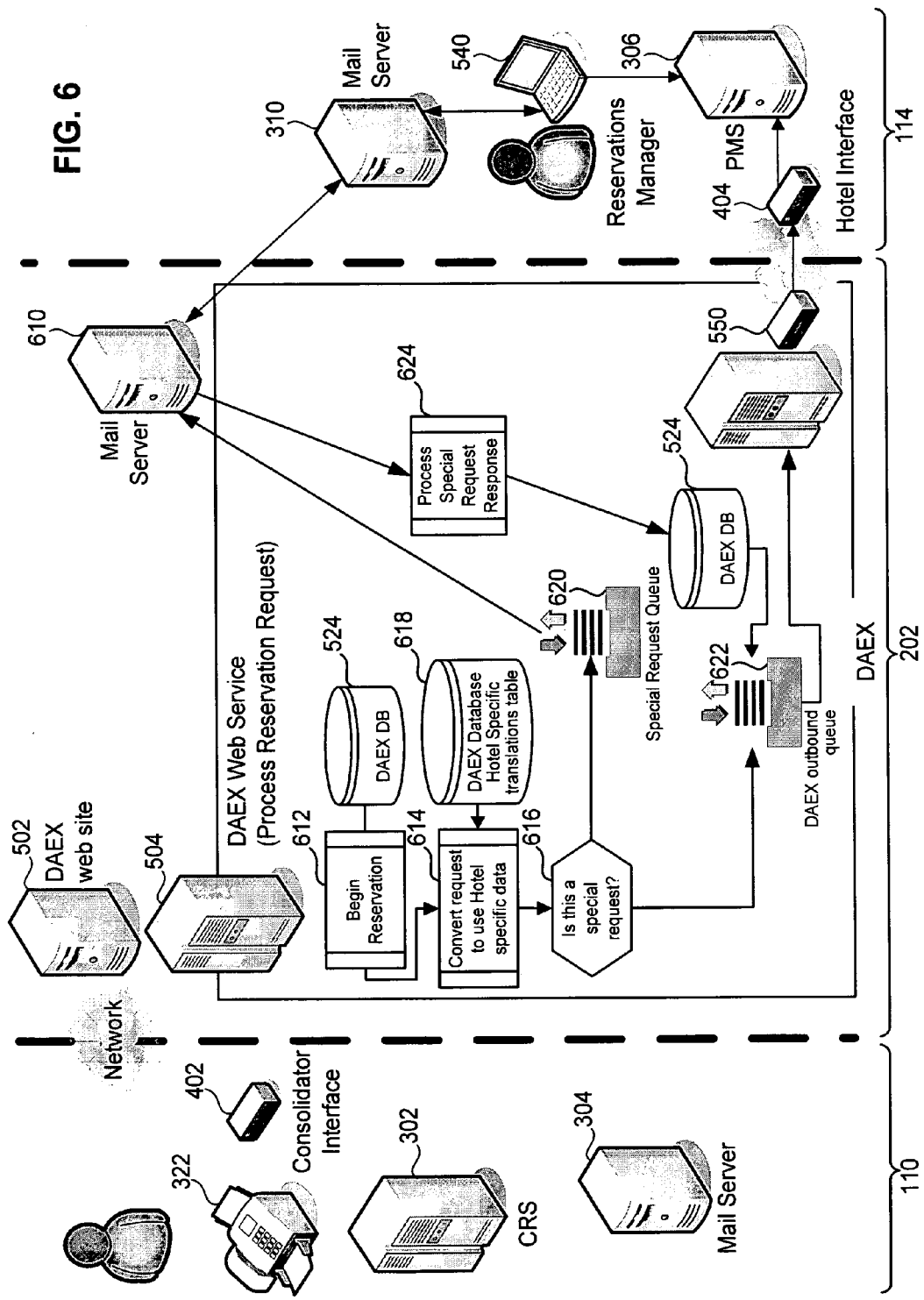
FIG. 6 illustrates how reservation requests are processed by DAEX web service.

FIG. 6 illustrates how reservation requests are processed by DAEX web service 202. The DAEX database 524 contains a table of all current requests awaiting confirmation. All these requests are stored in a queue 622 using an international standard room type and description, which are translated to provide a specific match for the property being booked. The mapping between International Standard description and hotel-specific description is done at the time of the hotel 114 adopting DAEX web service 202, as an automated mechanism to process the booking/reservation of rooms. Each hotel 114 using DAEX web service 202 has a record/profile within DAEX web service 202 that maps all room types to the DAEX web service 202 standard based on the internationally accepted descriptions described previously.

The hotel-specific reservation request is transmitted to the DAEX-PMS interface 404 at the hotel 114. This interface 404 (usually developed by the hotel's PMS vendor) provides an automated mechanism to place a reservation into the PMS 306. Certain checks are made at the PMS 306/Interface 404 level, which can include:

(a) Is the room requested available?

(b) Is the room suitable for the number of guest requested?

(c) Does the consolidator have the allocation available for the rooms requested?

(d) In the case of the last check, does the consolidator 110 have allocation available for the request? If the allocation is not available, then DAEX web service 202 can convert this booking into a special request (as described later in this document).

As shown in FIG. 6, once the reservation request is received, the reservation processing begins (see 612), in concert with the data in the DAEX database 524. The booking request is then converted, if necessary, to hotel-specific format (see 614), using the hotel-specific translation table, or database, 618. Then, a check is made if this is a special request (see 616). If it is not, it is then placed into the DAEX outbound queue 622. The interface 550 is used to transmit the request to the hotel interface 404, and to the PMS 306. If the booking request is a special request, it is placed in a special request queue 620. The request then goes into the DAEX mail server 610, which interfaces to the hotels mail server 310.

There are instances where a reservation may be subject to some special requests such as an early check-in, late check-out or a booking outside of the consolidator's allocation at the hotel 114. In these instances, DAEX web service 202 performs the translation of room type and description to the hotel standard, and then sends an email with all of the booking information, along with the special request, which is clearly highlighted to the hotel reservations department for approval.

If a reservation is subject to a 'special request', then the DAEX web service 202 will send that reservation to a reservation agent for confirmation (or rejection) through a process of the reservation agent replying to that reservation special request with a simple YES/NO response in the email body. If the response is YES, then DAEX web service 202 will send the reservation directly to the PMS interface 404 to be confirmed by the PMS 306, without the reservation agent having to enter (or re-enter) any information in the PMS 306.

The PMS interface 404 will return a reservation confirmation code to DAEX web service 202 which is then stored for later retrieval by the consolidator's CRS 302.

The response from the hotels' mail server 310 is processed (see 624), and is placed in the DAEX database 524. The request is then placed in the outbound queue 622, and is transmitted, through the interfaces 550 and 404, to the hotels' PMS 306.

FIG. 7 illustrates the handling of status request by the DAEX web service 202. A check of the status request is started (see 702). Credentials of the requestor, in this case, the consolidator 110, are checked (see 704). The DAEX credentials database or table 510 may be used for this purpose. The credentials are then authenticated (see 706). If the authentication has failed (714), this is communicated to the consolidator interface 402. Intrusion velocity check (712) may also be performed, and communicated to the consolidators' mail server 304.

If the authentication is successful, status is retrieved using the GUID (see 708), using the status information in the DAEX database 524. The response is sent to the consolidator (see 710), using the consolidator interface 402.

The interface 404 provided by the PMS vendor provides most, if not all, of the functionality made available to the hotel 114 reservation department. This includes the ability to use the interface 404 to add, change and cancel a reservation.

The interface 404 will return to DAEX web service 202 a confirmation code identical to the code that would be provided if someone where booking directly with the hotel's reservation office, i.e., the PMS confirmation is returned to DAEX web service 202.

The consolidator 110 can also request a status update on each outstanding reservation request by sending the previously issued GUID to the DAEX web service 202. This status request can either be initiated by the consolidator's CRS 302 or by the DAEX interface 402, where the DAEX web service 202 is not natively supported by the CRS 302. Alternatively, the DAEX web site 502 can show the current status of each request bases on the userID and password provided.

The process is as follows: the DAEX interface 402 provides the authentication information as described previously, along with the GUIDs, for each request that information is being requested on. The authentication process described previously then takes place, and, upon successful authentication, DAEX web service 202 retrieves the latest status from the DAEX database 524 that was previously populated by either the initial reservation request (on an outstanding request) or the response from the DAEX—hotel interface 404 (where a reservation has been processed by the hotel interface 404/PMS 306). The status for each GUID supplied is placed into an XML recordset that is returned by the DAEX web service 202 to the consolidator interface 402.

At the consolidator 110, a confirmation or rejection response is used to update the booking request in the CRS 302.

To cancel or change a booking, a call is made to the DAEX web service 202 containing the GUID of the initial reservation request (and an optional reason for the cancellation). DAEX web service 202 carries out the same authentication process as described previously, and then submits the cancellation or change request to the PMS interface (along with the original hotel confirmation code contained within the DAEX database). The hotel—PMS interface 404 is responsible for accepting the change or cancellation. The hotel—PMS interface 404 applies the rules already contained within the PMS 306 for the consolidator's rate/contract/allocation that the booking was made under. Note that the rules contained within the PMS 306 usually have restrictions as to when a cancellation can be made, for example if the booking to be cancelled is for tomorrow, then the hotel 114 will usually insist that the booking is paid for in full by the consolidator 110 (or guest), as the hotel 114 would be left with inventory that it may not be able to sell on such short notice.

If the hotel—PMS interface 404 rejects a cancellation request, then there is an option for the cancellation request to be submitted to the hotel Reservations Agent/Department 540 in the same way a special request booking is made (as described earlier), for example the hotel 114 is presented with the option of responding with a simple YES or NO to the request.

Note that DAEX web service 202 is price-agnostic. It is not necessary for the DAEX web service 202 to know price information in order to make the reservation with the hotel 114. All DAEX web service 202 needs to know is the identity of the consolidator 110 (which includes the relevant allocation information, the code which is assigned to consolidator by the hotel 114, and the rate code, or allocation identification, etc.). With this identifying information, but without a need for price information, DAEX web service 202 can "connect" the consolidator 110 with the hotel 114, make the reservation and get a confirmation, while being price agnostic and, therefore, price blind.

If DAEX web service 202 required the knowledge of pricing for its operation, few people would use it, since such information is considered confidential and sensitive in the hotel business. Therefore, from a commercial perspective, price blindness is a prerequisite for success.

The DAEX web service 202 also translates the request into a standard OTA format. If necessary, and if the hotel 114 uses its own code system, the DAEX web service 202 can translate the reservation request from the consolidator's format to the hotel's format.

The following exemplary reservation request rules are as follows:

1. Only one rate code per reservation is accepted.
2. One room type per reservation is accepted.
3. A reservation can be for as many people per room as the room can support in the PMS 306.
4. Each reservation request can only be for one room at a time
5. The reservation request should specify a hard date range in YYYY-MM-DD format.
6. If a rate code is not provided by the reservation source, the InventoryBlockCode and Room Type must be provided.
7. Room type is mandatory within the reservation request.

8. Special requests (SRs) may require different handling, and the codes used must be the ones agreed upon, otherwise the booking request may be rejected.

The GUID provided by the consolidator 110 serves as glue for all subsequent communication with DAEX web service 202, and serves as a transaction identifier.

A special request code should be mutually agreed between the consolidator 110 and DAEX web service 202. Only certain codes, like EC (early check-in) trigger the Special Request procedure. All other requests are treated as ordinary requests and sent to the PMS 306 as normal request messages. It is the requestor's responsibility to provide the right code. If, for example, the online reservation request contains a special request (like EC), the message will not be sent to the PMS 306 immediately.

The PMS-DAEX interface 404 will make the reservation on the PMS 306 side and return either "Reserved" or "Reservation Denied" message Frequently, the consolidator 110 has an allocation from the hotel 114, in essence, the hotel saying, "We grant you the right to sell X number of rooms at a price Y." Conventionally, if the consolidator 110 were to try to book more rooms at that price than had been allocated to him, the response from the hotel 114 would be along the lines of "Cannot confirm, reservation not made." DAEX web service 202 allows the hotel 114, based on its own business considerations, to handle this issue differently. DAEX web service 202 sends an email to the hotel's reservation manager 540, informing him of the attempt to book the room that is outside the allocation, and giving him the option of accepting or declining, for example, by typing the words "Yes" or "No" in the body of the reply, or in the subject line. The hotel 114 can then automatically enter the booking information into its own reservation system.

As one optional embodiment, a particular mechanism is may also be used to intercept the traditional communication of a booking from a consolidator 110 to a hotel 114. This includes intercepting emails that would normally go to the hotel reservation department 540 for manual processing/confirmation from the consolidators email server 304, by redirecting them to a consolidator interface 402 that takes the booking email and parses the required data required by the DAEX web service 202, to confirm or reject the booking request. Other examples of intercepts include interfacing with a Mail Application Programmable interface (such a Microsoft MAPI) to intercept both mail and fax output from consolidator reservation systems 302 and process them with DAEX web service 202 through the DAEX interface 402.

Additionally, DAEX web service 202 allows hotels 114 to know not only the business that they are getting (which they know from internal accounting), but also the business that they are not getting. This information, which is easily extractable from the queries and reservation requests to the hotel that subscribes to the DAEX service (and from comparison of reservations with similar parameters) can assist the hotels 114 in real time with their marketing and pricing.

Also, DAEX web service 202 can provide demographic information to local tourist authorities, such as how many people come to visit a particular city, what types of rooms they reserve, how long their average stay is, their origin, etc.

DAEX web service 202 also provides a profile matching facility to reduce the number of duplicate profiles created in the system. The profile matching is dependent on the amount of profile information received by DAEX web service 202. The profile matching works by using a user definable points system. The users define the number of points against each of the profile fields sent by DAEX web service 202. If the total number of points of an incoming profile is equal to or exceeds (e.g.) 1,000, then the profile is considered a match, and the reservation is attached to the existing profile in the PMS 306.

Conclusion

It should also be appreciated that various modifications, adaptations, and alternative embodiments thereof may be made within the scope and spirit of the present invention. The invention is further defined by the following claims.

What is claimed is:

1. A computer-implemented method of making a hotel reservation comprising:
    receiving a reservation request from a client by a booking source;
    transmitting, by the booking source, a price blind reservation request to a third party web service computer, wherein the web service computer is a price agnostic intermediary and wherein a price of a reservation is not specified in the reservation request and is not available to the third party price agnostic web service computer;
    processing the price blind reservation request, by the third party price agnostic web service computer, wherein the processing comprises:
        checking credentials of the booking source against a credentials table of the intermediary web service computer database,
        converting parameters of the reservation request from a format of the booking source to a format of the hotel using a translation table of the third party web service computer database, wherein the parameters comprise hotel room description,
        validating and normalizing the reservation request based on standard booking parameters reflecting a common hotel room type,
        generating a Globally Unique Identifier (GUID) for the reservation request and transmitting the GUID to the booking source,
        storing the reservation request in the intermediary web service computer database,
        placing the reservation request in a queue for processing, and
        responding to the booking source;
    forwarding the reservation request to the hotel from the third party web service computer;
    receiving, by the third party web service computer, a confirmation from the hotel;
    receiving, by the third party web service computer, polling inquiries from the booking source; and
    transmitting, by the third party web service computer, the confirmation to the booking source,
    wherein the reservation request is based on allocation parameters to the booking source from the hotel.

2. The method of claim 1, wherein the booking source is any of a consolidator, a travel agent, a tour operator, a Global Distribution System and a wholesaler.

3. The method of claim 1, further comprising transmitting, by the booking source, the reservation confirmation to a user.

4. The method of claim 1, wherein, if the reservation request exceeds the allocation, the hotel has an option of accepting the reservation request or declining the reservation request.

5. The method of claim 1, wherein the reservation request comprises a "special request."

6. The method of claim 1, further comprising providing a status of the reservation request in real-time from the hotel to the booking source through the third party web service computer.

7. The method of claim 1, wherein the allocation parameters are any of:

a booking source code;
a rate code; and
an allocation identifier.

8. A method of making a hotel reservation comprising:
receiving, by a third party web service computer, a price blind reservation request from a booking source in a format of the booking source, wherein the third party web service computer is a price agnostic intermediary and wherein a price of a reservation is not specified in the reservation request and is not available to the third party web service computer;
converting, by the third party web service computer, the price blind reservation request into a standardized format using a translation table of a web service computer database, wherein the converting further comprises:
 checking credentials of the booking source against a credentials table of the intermediary web service computer database,
 converting parameters of the reservation request from a format of the booking source to a format of the hotel using a translation table of the third party web service computer database, wherein the parameters comprise hotel room description,
 validating and normalizing the reservation request based on standard booking parameters reflecting a common hotel room type, and
 generating a Globally Unique Identifier (GUID) for the reservation request and transmitting the GUID to the booking source;
transmitting, by the third party web service computer, the reservation request to a hotel in the standardized format;
receiving, by the third party web service, a confirmation from the hotel; and
transmitting, by the third party web service computer, the confirmation to the booking source in the format of the booking source,
wherein, the price blind reservation request is based on allocation parameters to the booking source.

9. The method of claim 8, wherein the booking source is any of a consolidator, a travel agent, a tour operator, a Global Distribution System and a wholesaler.

10. The method of claim 8, further comprising transmitting, by the booking source, the reservation confirmation to a user.

11. The method of claim 8, wherein, if the reservation request exceeds the allocation, the hotel has an option of accepting the reservation request or declining the reservation request.

12. The method of claim 8, wherein the reservation request comprises a "special request."

13. The method of claim 8, further comprising providing a status of the reservation request in real-time from the hotel to the booking source through the third party web service computer.

* * * * *